(12) United States Patent
Van Bael (10) Patent No.: US 7,164,498 B2
(45) Date of Patent: Jan. 16, 2007

(54) COLOR MATCHING FOR A PRINTING PROCESS USING MORE THAN FOUR COLORANTS USING A FOUR-COLORANT COLOR MANAGEMENT SYSTEM

(75) Inventor: Kristiaan K. A. Van Bael, Hasselt (BE)

(73) Assignee: Esko-Graphics A/S, Lystrup (DE)

( * ) Notice: Subject to any disclaimer, the term of this patent is extended or adjusted under 35 U.S.C. 154(b) by 1022 days.

(21) Appl. No.: 10/177,636

(22) Filed: Jun. 20, 2002

(65) Prior Publication Data
US 2003/0234943 A1    Dec. 25, 2003

(51) Int. Cl.
H04N 1/60 (2006.01)
H04N 1/46 (2006.01)
G03F 3/08 (2006.01)
G06K 9/00 (2006.01)

(52) U.S. Cl. ............ 358/1.9; 358/504; 358/515; 358/518; 358/523; 382/162; 382/167

(58) Field of Classification Search ............ 358/1.9, 358/3.2, 515, 518, 523, 500–501, 534–536, 358/504; 382/162, 167; 399/178, 223; 347/24, 347/115, 175
See application file for complete search history.

(56) References Cited

U.S. PATENT DOCUMENTS

| | | | |
|---|---|---|---|
| 5,528,377 A | 6/1996 | Hutcheson | 358/298 |
| 5,563,724 A | 10/1996 | Boll et al. | 358/502 |
| 5,687,300 A * | 11/1997 | Cooper | 358/1.9 |
| 5,734,800 A * | 3/1998 | Herbert et al. | 358/1.9 |
| 5,751,326 A | 5/1998 | Bernasconi | 347/115 |
| 5,870,530 A * | 2/1999 | Balasubramanian | 358/1.9 |
| 5,892,891 A * | 4/1999 | Dalal et al. | 358/1.9 |

(Continued)

FOREIGN PATENT DOCUMENTS

WO    WO 95/27231    10/1995

OTHER PUBLICATIONS

J. P. Van de Capelle and B. Meireson, "A new method for characterising colour printing devices", Colour Imaging in Multimedia Conference—CIM '98, Mar. 16-20th, 1998, University of Derby, England.

(Continued)

*Primary Examiner*—Kimberly Williams
*Assistant Examiner*—Charlotte M. Baker
(74) *Attorney, Agent, or Firm*—Dov Rosenfeld; Inventek (57) ABSTRACT

A method for representing a digital image in an extended CMYK color space that has an extended color gamut. The image is for output to an output device that uses a set of more than four colorants and is capable of reproducing the extended color gamut. The method includes providing a transformation from the extended CMYK color space to amounts of each of the set of colorants of the output device, providing a device profile for the extended CMYK color space that is associated with the transformation and that provides for converting a first color represented by a first set of color coordinate values in a first color space into a set of CMYK values in the extended CMYK color space such that the output device behaves as if it was a CMYK device with the extended CMYK values, and representing the digital image in the extended CMYK color space.

62 Claims, 3 Drawing Sheets

U.S. PATENT DOCUMENTS

| | | | |
|---|---|---|---|
| 6,058,207 A | 5/2000 | Tuijn et al. | 382/162 |
| 6,152,999 A | 11/2000 | Erdtmann et al. | 106/31.6 |
| 6,172,692 B1 | 1/2001 | Huang et al. | 347/43 |
| 6,203,953 B1 | 3/2001 | Dalal | 430/47 |
| 6,229,626 B1 | 5/2001 | Boll | 358/1.9 |
| 6,282,311 B1 | 8/2001 | McCarthy et al. | 382/162 |
| 6,282,312 B1 | 8/2001 | McCarthy et al. | 382/162 |
| 6,282,313 B1 | 8/2001 | McCarthy et al. | 382/162 |
| 6,285,784 B1 | 9/2001 | Spaulding et al. | 382/162 |
| 6,307,645 B1 | 10/2001 | Mantell et al. | 358/1.9 |
| 6,335,983 B1 | 1/2002 | McCarthy et al. | 382/162 |
| 6,344,903 B1 | 2/2002 | Derhak et al. | 358/1.9 |
| 6,352,806 B1 | 3/2002 | Dalal | 430/42 |
| 6,373,580 B1 | 4/2002 | Walker | 358/1.1 |
| 6,389,161 B1 | 5/2002 | Krabbenhoft | 382/167 |
| 7,027,191 B1 * | 4/2006 | Steinhauer | 358/3.2 |

OTHER PUBLICATIONS

Q. Lin, "Color FM screen design using DBS algorithm" in *SPIE/IS&T International Technical Group Newsletter: Electronic Imaging*, p. 9, Jan. 1999.

M. Mahy, "Insight into the solutions of the Neugebauer equations" in *SPIE/IS&T International Technical Group Newsletter: Electronic Imaging*, pp. 7 & 11, Jan. 1999.

T. J. Cholewo, "Printer model inversion by constrained optimization," in *Proceedings of the IS&T/SPIE's 12th Annual Symposium, Electronic Imaging 2000: Science and Technology*, (San Jose, Calif.), pp. 349-357, Jan. 2000.

V. Ostromoukhoc, "Chromaticity gamut enhancementby heptatone multi-color printing", *IS&T/SPIE 1993 International Symposium on Electronic Imaging: Science Technology*, SPIE vol. 1909, pp. 139-151, 1993.

* cited by examiner

COLOR MATCHING FOR A PRINTING PROCESS USING MORE THAN FOUR COLORANTS USING A FOUR-COLORANT COLOR MANAGEMENT SYSTEM

BACKGROUND

The invention relates to pre-press, computerized color graphics, color reproduction, and electronic printing systems. In particular, the present invention relates to a method and apparatus for characterizing an output device that uses more than four colorants using technology for output devices that use at most four colorants.

The color gamut of a four-color printing process using CMYK is not very large and therefore some colors cannot be reproduced using only CMYK. Thus, processes using more than four inks have been developed in order to increase the color gamut. These additional inks are not "spot colors" used to create special effects, like luminescent inks. The additional inks are intrinsically part of the color separation process to create realistic images.

An example of printing with at least six inks is PANTONE's Hexachrome® system from PANTONE, Inc., Carlstadt, N.J., consisting of CMYK inks complemented with an Orange and a Green ink (CMYKOG). Another example is known as Küppers' ink set that uses CMYK, a Red, a Green, and a Blue ink (CMYKOGB). See H. Küppers: "Die Farbenlehre der Fernseh-, Foto- und Drucktechnik", Du Mont Verlag., Köln, 1985.

Color management provides tools to match colors for color separation, color proofing, and color simulation. Specifically, color management provides tools to:

Convert images from one color space, e.g., that of a color scanner to another color space, e.g., that of the output device. This is called color separation.

Convert images that are for output on an output device to a proofer device such that colors match.

Simulate the appearance of images that are for output on an output on another device such as a color monitor.

Color may be specified with only three color coordinates, e.g., CIE-XYZ or CIE Lab, so using six or seven or more colors for printing makes the calculation of the required colorant values, e.g., the separations for any particular color rather complex. There are more values to determine—6 or more—than the three coordinates defining the color, so the problem is "underdetermined," i.e., there are more variables to be determined than inputs. The more inks, the more difficult the determining of the separations. Thus there is a need for a method for determining good color separations when there are a large number of inks used.

Known methods for determining good color separations are often based on first measuring the colorimetric properties of patches of different amounts of a set of inks printed in sequence on top of each other. Modem color management techniques for obtaining color separations, such as COLORSYNC™ (Apple Computer, Inc., Cupertino, Calif.) and the methods promoted by the International Color Consortium (ICC, see http://www.color.org) are based on this. The technologies use color profiles that convert the colorant values into some device independent color space such as CIE-XYZ or CIE-Lab, and also convert from the device independent space to the colorant values. While these techniques can produce accurate results, and also work for halftone images, they are practically limited to four ink systems. This is because of the large number of measurements of patches of combinations of more than 4 inks that would be needed. For example, the IT8.7.3 chart (American National Standards Institute [ANSI] Committee IT8 for Digital Data Exchange Standards) contains nearly a thousand patches for a four color output. Because of the large number of measurements, it is very difficult to characterize sets of more than four colorants, for example printing with six or seven colors. Furthermore, it is also difficult to make color separations for these printing systems based on their measured colorimetric properties. Thus, it is difficult to generate profiles that convert the more than four colorants, e.g., CMYKOG to CIE-XYZ or CIE-Lab—this needs lots of data to be measured and stored in the profile—and further to convert CIE-XYZ or CIE-Lab to the more than four colorants, e.g., CMYKOG. Thus there has been some effort to find better techniques applicable to more than four colorants or to different colorants.

Because color management technology using at most four colorants is well known, and because there is a body of expertise and software for manipulating images provided in CMYK, there is a desire for working with CMYK data that has the gamut of a process using more than four colorants.

SUMMARY

Described herein is a method for representing and editing a digital image in what is called a "virtual" CMYK and an "extended CMYK" color space herein: a CMYK color space that has an extended color gamut that is wider and/or has more dynamic range than ordinary CMYK, wherein the C, M, Y, and K values do not necessarily represent amounts of inks of an output device. The image is for output to an output device that uses a set of more than four colorants and is capable of reproducing the extended color gamut. The method includes providing a transformation from the extended CMYK color space to amounts of each of the set of colorants of the output device, providing a device profile for the extended CMYK color space that is associated with the transformation and that provides for converting between a first color space wherein a color is defined by a set of color coordinate values and the extended CMYK color space wherein a color is defined by CMYK values such that the output device behaves as if it was a CMYK device with the extended CMYK values, and representing the digital image in the extended CMYK color space. The color of a print produced by printing the colorant values obtained by transforming the extended CMYK values would match the color of the set of color coordinate values in the first color space that would result from applying the conversion of the device profile to convert the extended CMYK values into the first color space.

In one embodiment, the set of colorants of the output device includes CMYK and at least one additional colorant such that the gamut of the output device is extended beyond a device that uses only the CMYK. One example is CMYKOG, and another CMYKRGB.

In one embodiment, the transformation is continuous. Furthermore, in one embodiment, the transformation maps the whole of the CMYK space onto a subspace of the space defined by the colorants of the output device. Furthermore, in one embodiment, the transformation separately transforms the extended black to the black in the set of colorants.

In one embodiment, the digital image is provided in a regular CMYK color space as set of regular CMYK-separations. The method includes converting the CMYK values in the image to extended CMYK values in the extended CMYK color space. The transformation is such that the combination of converting the CMYK values in the image to extended CMYK values and transforming the image to the set of colorants maintain the regular CMYK-separations intact and add one or more additional colorants.

DETAILED DESCRIPTION

Figure 1:
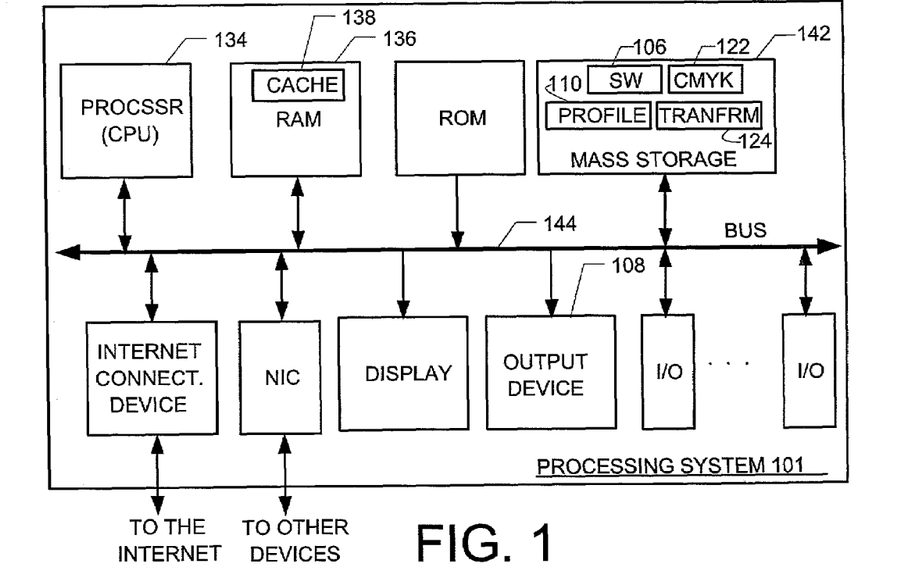
FIG. 1 shows a computer system in which the present invention may be implemented.

Method embodiments of the invention are implemented on a computer system that includes one or more processors, memory, and a storage subsystem. However, alternate embodiments of the invention may be embodied in dedicated devices such as printer controllers. FIG. 1 is a simplified block diagram of a computer system 101 in which method embodiments may be embodied. A computer system such as shown in FIG. 1 is standard. A computer system such as system 101 suitably programmed to embody one or more aspects of the present invention, however, is not prior art. The computer system includes one or more processors 134, a storage subsystem 142, and a memory subsystem that includes random access read/write memory (RAM) 136, a cache 138, and a read-only memory (ROM). The computer system shown in FIG. 1 includes other elements that communicate via a bus subsystem 144, as is standard. The term "bus subsystem" is used generically to include any mechanism for letting the various components of the system communicate with each other. In one embodiment, the method is provided in the form of a computer program (software 106) that is stored in the storage subsystem 142. That is, a carrier medium is provided that carries one or more computer readable code segments that instruct one or more of the processors 134 to carry out the steps of the inventive method. Also shown stored in mass storage is a CMYK image 122, a transformation 124 from the space of the CMYK image to a set of more than four colorants for outputting to a device, and a device profile 110 associated with the device and transformation. The software and other shown contents of mass storage are described in more detail below.

Workflow with Virtual CMYK Press

Figure 2:
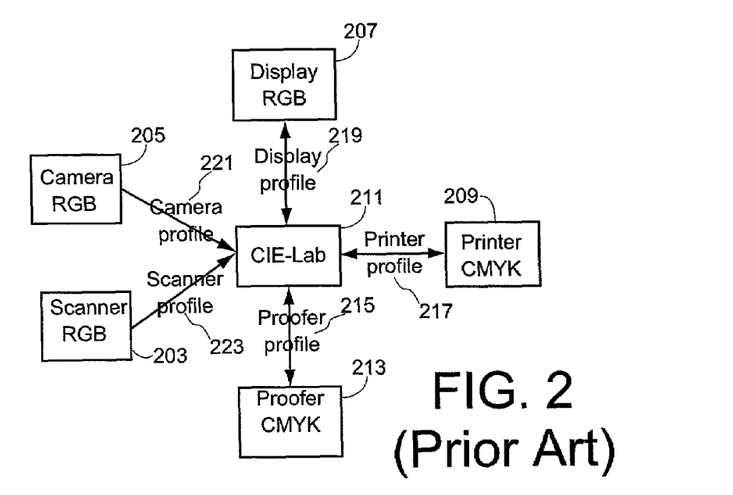
FIG. 2 shows a conventional arrangement that supports many workflow that use a modem color management system (CMS).

FIG. 2 shows a conventional arrangement that supports many workflow that use a modem color management system (CMS). Only a subset of such workflows are described herein. Device profiles such as those conforming to the International Color Consortium (ICC) (information available at www.color.org) provide information on how to convert device dependent color information to and from some device independent color space. The device independent color space may be the CIE-XYZ space, the CIE-Lab space, the sRGB space, or some other device independent space. The workflow of FIG. 2 uses the CIE-Lab space, and an image in that space is shown as 211. Part or all of the image may be provided from a scanner that operates in the scanners RGB 203. Part or all of the image may be from a digital camera that operates in the camera's RGB 205. Part or all of the image may alternately be defined using some image creation software in the CIE-Lab space 211. A display that operates in the display's RGB color space 207 may be provided for viewing the image. Part or all of the image may alternately be created in the display's RGB color space 207. In many cases, the image is for printing using some output process, e.g., an imagesetter and printer using some CMYK inks. Thus, the printer has its CMYK space 209. Furthermore, a proofing device may be provided shown that also uses CMYK, so that the image in the proofer's CMYK color space is shown as 213.

A device profile for a device is a set of data that provides a mapping between the device's color space and the device independent color space, while maintaining a color match. Although device-to-device profiles also exist, they are usually made up from the two profiles between each device and the device independent color space. Each device has a color gamut that defines the range of colors that the device is limited to measuring (for an input device) or rendering (for an output device). A typical output device profile includes gamut information that provides for an indication of colors that are outside the gamut, and for gamut mapping to map colors that are outside the device's gamut into "close" colors.

Some typical workflows for generating a printed image are now described. For the sake of brevity, not all workflows that use the arrangement shown in FIG. 2 are described.

Suppose some of the image is scanned. The scanner RGB values 203 are transformed to the device independent colors—CIE-Lab values in the example using the scanner's device profile 223. Other parts of the image may be photographs obtained from a digital camera, and those RGB values 205 are transformed to the device independent colors using the camera's profile 221. An image-editing application program (software) may operate in a computer such as computer system 101 including using a display in the display's color space 207 to view the image. The complete image containing images from the scanner and camera may be viewed on the monitor by converting the image data to the monitors RGB using a profile 219 for the monitor. The image may be edited, i.e., the images modified, and additional elements such as text added while the data remains in an RGB space, e.g., the monitor's RGB space. While the two input device profiles 221 and 223 were only used in one direction—from device to device independent color, in this example the monitor's profile 219 provides also for converting the RGB to the device independent colors 211. The data may be for output to a printing system and a profile 217 is provided to convert the device independent values 211 to the printer CMYK. Part of this conversion may require some gamut mapping, i.e., reducing the gamut of the original data to be within the gamut of the printer. The resulting printer CMYK data 209 may now be provided to a printing service for output.

Prior to making printing plates—for workflows that include printing plates—the printer may want to see how the data will look in print, and further may want to adjust the image. Furthermore, in pre-press, color management often starts with CMYK-separations that are provided without color management. A system such as shown in FIG. 2 also provides for viewing and manipulating data that is in CMYK. The printer profile 217 provides for conversion from the printer's CMYK data 209 back to the device independent data. The image may now be output on a proofing device by converting to the proofer's CMYK 213.

A proofer profile 215 is provided for such a purpose. The image may also be viewed by converting the device independent data to the display's RGB. The image may also be modified, for example while in the printer's CMYK color space 209. The result of the modification may be viewed on a display or proofed in the proofer or both displayed and proofed prior to printing.

The workflows described above are familiar to those in the graphic arts, and many tools are available to facilitate such workflows. It is desired to use the same workflows for output to a printer that uses the four colorants CMYK and at least one colorant, e.g., in order to provide a larger gamut or in order to provide for a greater number of resolvable colors within a gamut. Consider such a printer that uses a set of N colorants that include CMYK and at least one more colorant. According to one aspect of the invention, a transformation is defined from a first CMYK color space to coverage percentages of the N colorants of the output device such that the gamut is extended beyond that available on the output device using only C, M, Y, and K. BY an extended gamut is meant a gamut that covers a larger volume, or one that provides for a larger dynamic range in for some colors. Thus, a CMYKOG output device typically has a larger gamut than CMYK printer, while a device that uses CMYK and additionally light magenta and light cyan colorants may have a gamut that provides for greater dynamic range in cyan and magenta. Thus, a "virtual" CMYK color space is defined that has a color gamut wider or having more color dynamic range than that available on the output device using only C, M, Y, and K. We call this CMYK space "extended CMYK," and we call the gamut that the extended CMYK values cover the "extended gamut." Any CMYK values in this space do not necessarily represent the coverage percentages of actual colorants used in the output process—hence the word "virtual." The extended CMYK values are for transforming to the actual coverage percentages of the N colorants. In addition, a device profile is defined that converts between a device independent color space, e.g., CIE-Lab and the extended CMYK space such that a color in CIE-Lab that is within the extended gamut converted by the profile to extended CMYK and converted by the transformation to the colorant coverage percentages produces a color match. Note that as is commonly understood in one on the art, the term "color match" means a color match to some agreed-upon level of accuracy, e.g., a number of ΔE values. Furthermore, the profile provides a transformation from any CMYK values to the device independent color space. Furthermore, the device profile provides gamut definition and in one embodiment, gamut mapping for any color defined in the device independent color space to the extended CMYK.

Figure 3:
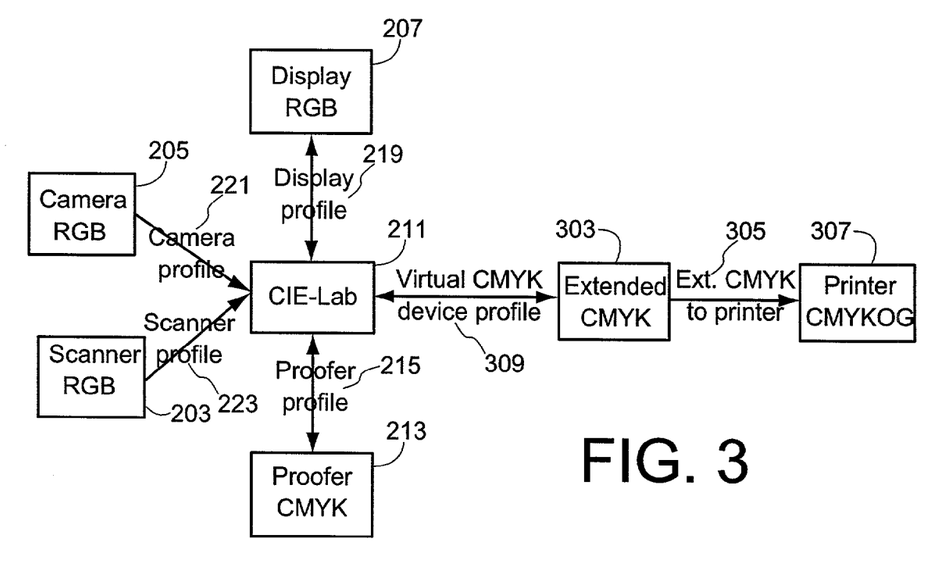
FIG. 3 shows the workflows of FIG. 2 but with the CMYK device being an extended CMYK device—a "virtual" device—that is defined by an extended CMYK device profile.

Providing the extended CMYK to printer colorants transformation, and the extended CMYK device profile defines a "virtual CMYK device" that has a gamut that is wider and/or offers more color dynamic range than available by printing CMYK. Using such a virtual CMYK device provides familiar workflows. FIG. 3 shows the workflows of FIG. 2 but with the CMYK device being an extended CMYK device that is defined by an extended CMYK device profile 309 to and from the CIE-Lab space and the extended CMYK space 303, and an extended CMYK to printer transformation 305 that converts to the device colorants, CMYKOG in this example.

The user working with images for output to the CMYKOG printer need not be concerned with the fact that the printer uses more than four colorants. The software application used for manipulating images in CMYK does not need to be aware that the data is for output to a printer that uses more than four colorants. The user pretends to be working with a regular CMYK output device defined by the profile 309. For example, one or more parts of a job are converted from scanner RGB 203, other from a camera RGB 205, or some other profile to the extended CMYK space 303, typically but not necessarily via a device independent color space. They can be modified, e.g., visually edited in an application program such as ColorTone™ (Esko-Graphics—formerly Barco Graphics NV, Zwijnaarde, Belgium) or Photoshop® (Adobe Systems, Inc., San Jose, Calif.) using the extended CMYK profile 309 and any required display device profile 219 for visualization. Any of these applications may additionally be used to convert the data into the virtual CMYK space. For the retoucher, it appears as if very bright colors can be achieved with only CMYK. Otherwise, he or she would not be aware they are working for output in a device with more than the CMYK colorants.

Figure 4:
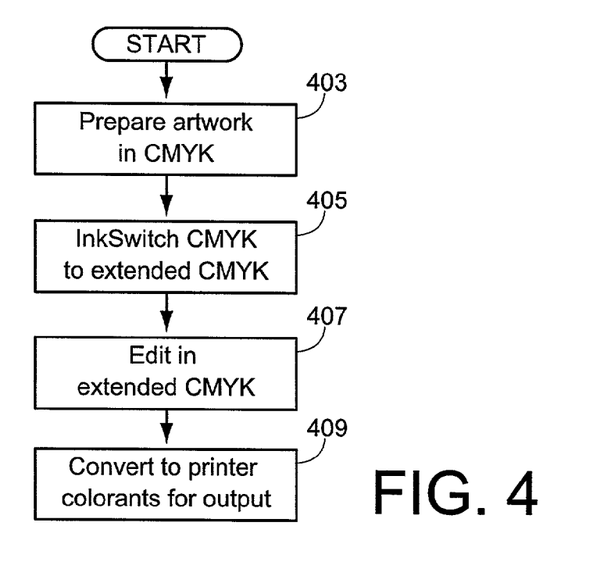
FIG. 4 shows a workflow that is applicable to linework and that uses one or more aspects of the invention.

FIG. 4 shows one workflow that is applicable to linework. Any linework in an image may be created as usual, e.g., using application programs such as PackEdge™ (Esko-Graphics—formerly Barco Graphics NV, Zwijnaarde, Belgium) or Illustrator® (Adobe Systems, Inc., San Jose, Calif.). The creation is shown in step 403. In a step 407, the programs can be used to create and manipulate such linework directly in extended CMYK. Furthermore, such programs used for linework automatically provide for visualizing the extended CMYK having an enhanced gamut. As shown in step 405, any linework in an image that was created in regular CMYK can also be "inkswitched" from the regular CMYK to the extended CMYK color space. See for example, U.S. Pat. No. 5,689,349 (issued Nov. 18, 1997) to inventors Plettinck, et al., titled *METHOD AND DEVICE FOR GENERATING PRINTING DATA IN A COLOR SPACE DEFINED FOR NON-STANDARD PRINTING INKS* that describes a method to transform a set of colors specified in one set of inks, e.g., a first CMYK set to the corresponding set of colors specified in a different set of inks, in this case, the extended CMYK inks, while preserving color appearance. Furthermore, it might be that certain spot colors, e.g., colors defined by a PANTONE number (PANTONE, Inc., Carlstadt, N.J.) are manually replaced by their (virtual) CMYK match, e.g., using a published table of what virtual CMYK combinations for certain spot colors. It might further be that a user is provided with a color book of color patches of (virtual) CMYK colors and their percentages. Thus, the linework is provided in extended CMYK. When the linework is ready to be output, in a step 409 the extended CMYK values are separated into the printer colorant values for output.

Proofing a job that is in extended CMYK is also identical to proofing for a regular CMYK printer's CMYK. The proofer will produce an image from the extended CMYK space to its color space with an enhanced gamut as well.

To output a job in extended CMYK by the output device that uses the more than four colorants, the extended CMYK values are passed through the extended CMYK to printer transformation 305 to produce separations in the colorants of the printer. When printed, the separations automatically produce a color match.

These separations may be stored with some reference to the extended CMYK to colorant transformation and to the profile.

The Extended CMYK to Colorant Transformation

One aspect of the invention is providing a transformation from extended CMYK values to the colorant coverage percentages of a printing device that uses a set of colorants that includes CMYK and at least one additional colorant such that the gamut is extended. We call this extended colorant transformation herein. This extended colorant transformation does not need to carry out any color matching. Color matching is incorporated in the virtual CMYK device profile 309. The purpose of the extended colorant transformation is to enhance the gamut of regular CMYK, e.g., by "blowing up" one or more selected colors beyond those achievable using only regular CMYK.

Many transformations are possible, and different embodiments of the invention may use different transformations. The transformation has the following properties:

The transformation is continuous. That is, a small change in the CMYK space produces a small change in the color space defined by the N-colorants. Thus, a small change in the CMYK space produces a small change in the perceived color. A smoothly varying image will remain smoothly varying after transformation. A non-continuous transformation may introduce tonal jumps in the separations. If there are such jumps, color contours may appear in the output. The requirement for color transformations to be continuous is well known in the art.

The transformation maps the whole of the CMYK space onto a subspace of the space defined by the colorants of the output device. For example, if the output device uses the CMYKOG colorants, the whole extended CMYK space is mapped into subspace of the CMYKOG color space. This subspace defines the gamut of the transformation.

It also is desirable but not necessary for the transformation to have the following properties:

It is desirable but not necessary that the subspace onto which extended CMYK space is mapped includes as much as possible of the complete colorant color space so that working in the extended CMYK space provides all perceptual colors that are possible with the printer.

It is desirable but not necessary that the transformation separately transforms the extended black to the printer's black. By mapping extended black to printer black, the extended black translates directly the real black used for printing. This may facilitate the profiling of the extended CMYK space (see later). Separately transforming black also preserves such elements as overprinted black text. It further preserves black-behavior of images such as gray replacement, undercolor removal, and so forth.

In the case that data is provided as a set of regular CMYK separations, it is desirable but not necessary to maintain the regular CMYK-separations intact and add one or more additional colorants, such as orange and green on the bright orange and green parts of the color space. This would enable one to prepare the artwork in regular CMYK for improved printability, e.g., by performing trapping. Maintaining the regular CMYK-separations intact ensures that any such trapping carried out on the CMYK separations is retained by the transformation and still meaningful in reducing overprint artifacts. Furthermore, if the transformation leave the CMYK-channels untouched, only adding extra colorants printed over the CMYK, then the transformation would be easy to reverse.

It is desirable but not necessary to have the transformation be reversible. For any reversible transformation, if the artwork was already transformed to the (more than four) printer colorant space, the artwork could still be proofed or visualized by a CMYK-color management system simply by disregarding the extra (non CMYK) channels and attaching the virtual CMYK profile.

A First Extended CMYK to Printer Transformation

A first embodiment converts CMYK to CMYKR by adding red to a color (C1,M1,K1,Y1) in proportion to the amount of red in that color (C1,M1,K1,Y1). Note that a reddish color may be formed by combining magenta and yellow. Thus, the first embodiment converts CMYK to CMYKR by adding red to a color in proportion to the amount of magenta and yellow. That is, $$C,M,Y,K \rightarrow C,M,Y,K, \alpha\{\min(M1,Y1)\}, \quad \text{Eq. 1}$$

where $\alpha$ is a constant. In one embodiment, $\alpha$ is one.

In another embodiment, $$C,M,Y,K \rightarrow C,M,Y,K, f(\min(M1,Y1)), \quad \text{Eq. 2}$$

where $f(.)$ is a monotic function.

Another version of the first transformation uses orange ink rather than red ink, i.e. converts CMYK to CMYKO with O a function of the amount of yellow and magenta.

A Second Extended CMYK to Printer Transformation

A second extended CMYK to printer transformation also adds red or orange to a color in proportion to the amount of red in that color. However, in order to reduce the total amount of ink used, the amount of red in the image, i.e., magenta or yellow or both, is reduced according to the amount of red or orange added. In one embodiment, when an amount R of red (or orange) is added, Y is reduced by an amount $\alpha_1$ R and C is reduced by an amount $\alpha_1$ R, where $\alpha_1$ is another constant less than or equal to 1.

In one version, CMYK is converted to C'M'Y'K'O', with $$C'=C,$$

$$M'=M-0.5*f(\min(M,Y)),$$

$$Y'=Y-0.5*f(\min(M,Y)),$$

$$K'=K, \text{ and}$$

$$O'=f(\min(M,Y)), \quad \text{Eqs. 3}$$

where $f(.)$ is some monotonic function, such that the sum of densities is not altered by the transformation.

A Third Extended CMYK to Printer Transformation

A third extended CMYK to printer transformation also adds orange to a color in proportion to the amount of red and yellow in that color, but only in the case for reddish colors. Orange is added only for colors where both yellow and magenta are higher than the amount of cyan.

Note THAT orange may be formed by combining red with yellow and red may be formed by combining magenta and yellow. Thus, the third embodiment transformation converts CMYK to CMYKO by adding orange to a color in proportion to the amount of red and yellow in that color. The amount of red in the color (C1,M1,K1,Y1) may be estimated as [min(M1,Y1)−C1]. The amount of orange in that image may thus be estimated as {min([min(M1,Y1)−C1],Y1−max(C1,M1))}. The third embodiment transformation adds orange colorant O in proportion the magenta and yellow, e.g., an amount $\alpha$ {min([min(M1,Y1)−C1],Y1−max(C1,M1))} where $\alpha$ is a constant. In one embodiment, $\alpha=2$, so that the maximum O value is 100%.

Thus CMYK to CMYKO transformation 1 may be summarized as:

$$C,M,Y,K \to C,M,Y,K, \alpha\{\min([\min(M1,Y1)-C1],Y1)-C1\}. \quad \text{Eq. 4}$$

Another version of the third transformation uses red ink rather than orange ink, i.e. converts CMYK to CMYKR. Red is added to the reddish colors in an amount that increases with the "redness." The amount of red in the color (C1,M1,K1,Y1) may be estimated as [min(M1,Y1)−C1]. In a version in which the red is added in proportion to the redness, CMYK to CMYKR transformation 1 may be summarized as:

$$C,M,Y,K \to C,M,Y,K, \alpha[\min(M1,Y1)-C1]. \quad \text{Eq. 5}$$

where α is a constant.

In another version, the CMYK to CMYKO transformation is $$C,M,Y,K \to C,M,Y,K, f[\min(M1,Y1)-C1],. \quad \text{Eq. 6}$$

where f(.) is a monotonic function.

A Fourth Extended CMYK to Printer Transformation

A fourth extended CMYK to printer transformation purifies the red region by reducing the amounts of cyan where yellow and magenta are already dominant. When cyan can no longer be reduced, red or orange is added as if it was "negative" cyan. Note that this keeps the total number of inks used for any color at four. Note that another version of this transformation adds red ink rather than orange ink.

The method thus determines the amount of red (or orange). The amount of red in the color (C1,M1,K1,Y1) may be estimated as [min(M1,Y1)−C1]. The cyan is now reduced by an amount that is monotonic to the amount of red. In one embodiment, the cyan is reduced by an amount proportional to the amount of red thus C1 is changed to $C1_{new}$ where $$C1_{new} = \min(0, C1 - \alpha[\min(M1,Y1)-C1]), \ 0 < \alpha \leq 1.$$

The amount of red added is a function, denoted f(.) of the amount of "negative cyan," i.e., $$R = f\{\min(0, \alpha[\min(M1,Y1)-C1]-C1)\} \quad \text{Eq. 7}$$

In one version, the function is monotonic, and in a particular version, the function is proportion, so $$R = \beta \min(0, \alpha[\min(M1,Y1)-C1]-C1), \quad \text{Eq. 8}$$

where β is some constant, 0<β≤1. One version uses β=1/α.

A Fifth Extended CMYK to Printer Transformation

A fifth extended CMYK to printer transformation purifying the red (or orange) region by reducing amounts of cyan where yellow and magenta are already dominant, and when cyan can no longer be removed, adds red (or orange) as if it was "negative cyan", and further purifies the green region by reducing the amount of magenta where cyan and yellow are already dominant until there is no more magenta, then adds green ink as if it were "negative magenta." Another version further purifies the blue region by reducing the amount of yellow in those colors in which cyan and magenta were dominant. If there is no more yellow to remove, the transformation adds blue ink as if it were "negative yellow." Note that like the fourth extended CMYK to printer transformation, both versions of the fifth extended CMYK to printer transformation maintain the total number of inks printed to four. In one embodiment, the following are the combinations: CMYK, OMYK, CGYK, and CMBK.

A Sixth Extended CMYK to Printer Transformation

A sixth extended CMYK to printer transformation, like the second version of the fifth extended CMYK to printer transformation, converts CMYK to CMYKRGB. In this case, the transformation conforms to the OpalTone® inks (Opaltone Graphic Solutions Pty Ltd, Sydney, Australia). See www.opaltone.com and U.S. Pat. No. 5,751,326 to Branasconi for a description of the OpalTone color set. One property of the CMYK to OpalTone transformation is that additional inks are added, while the CMYK remain unchanged.

Other Extended CMYK to Printer Transformation

U.S. Pat. No. 5,892,891 to Dalal, et al., incorporated herein by reference, describes a method of converting a device independent color to amounts of up to four colorants selected from a set of more than four colorants. Either one of CMY and K, or a complement is present so that no more than four inks are printed. It would be clear to one in the art how to modify the Dalal, et al. method to provide a transformation from extended CMYK to amounts of up to four colorants selected from a set of more than four colorants. The resulting method is similar to the fourth and fifth methods described above.

The practitioner will thus realize that many possible extended colorant-to-printer transformations may be used, each having different properties.

Screened Data

It may be that the output device is a screened device, and that the transformation from the extended CMYK to colorants requires specifying the screens for the non-CMYK data. In one embodiment, when one, two, or three additional colorants are included that are complementary to C, M, or Y, respectively, each additional colorant uses the same screen angle as its complement. Thus, orange or red uses the same screen angle as cyan, and so forth.

Profiling

Figure 5:
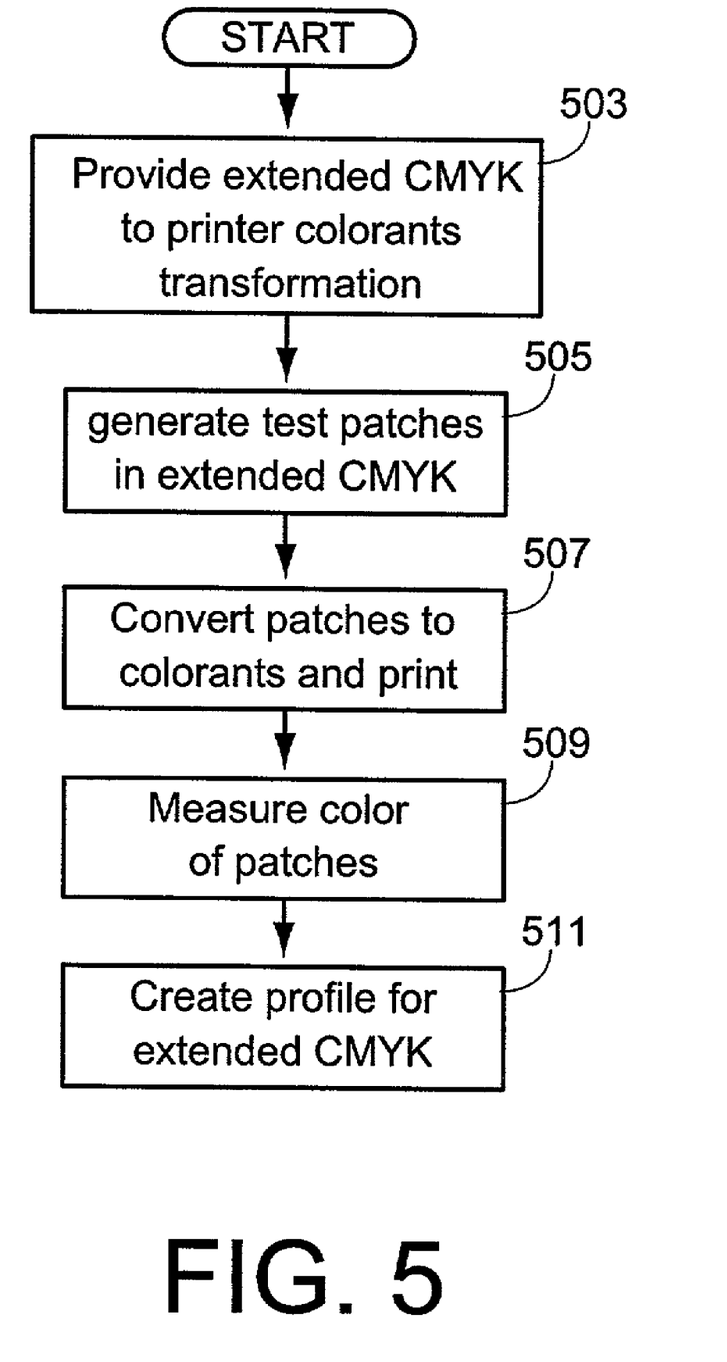
FIG. 5 shows a flowchart of one method of determining an extended CMYK profile.

One aspect of the invention is providing a device profile that is associated with an extended CMYK to colorant transformation for a reproduction process and device. The profiling provides color conversions to and from a device independent color space to the extended CMYK space such that colors match when they are within the spectrum of the colorants. The resulting profiles, being to and from CMYK, may be used in traditional workflows, and may be ICC profiles. One aspect of the invention is the ability to use conventional profiling tools to generate the device profile. FIG. 5 shows a flowchart of a process of generating a device profile. The profile is associated with an extended CMYK to printer colorant transformation, so step 503 is providing such a transformation. In a step 505, the extended CMYK for a set of test patches is generated. In one embodiment, the set of test patches is the commonly used IT-8 target suggested by the ICC. This target is available, for example, as a TIFF file that defines the patches in terms of amounts of C, M, Y, and K. In a step 507, the test patch data is converted to sets of the printing colorants using the provided extended CMYK to colorant transformation, and output, e.g., printed on the output device. In a step 509, the colors of the resulting printed patches, e.g., the CIE-Lab values or CIE-XYZ values are measured using a colorimeter or other color measuring device, e.g., a photospectrometer. Thus, for each printed patch, a pair is formed of a set of extended CMYK amounts and the measured color of the patch. These pairs provide the data from which a conversion to and from the device independent color space and the extended CMYK space is formed in a step 511. In one embodiment, the conversion uses a three-dimensional lookup table and three-dimensional interpolation, together with one or more sets of one-dimensional conversions. The conversion data is stored in the profile.

Gamut Mapping

The output device has a gamut. It is desirable to use as much of the gamut as possible. In general, the extended CMYK to colorant transformation defines a gamut that is bigger than the gamut of a CMYK device but it doesn't necessarily cover the entire color gamut of the device. Thus, in general, the device and the extended CMYK to colorant transformation define a color gamut. In one embodiment, the profile includes gamut mapping that automatically converts colors in the device independent color space that are outside the gamut defined by the device and the extended CMYK to colorant transformation into colors within the gamut. Several gamut mapping criteria may be used, as is known in the art, and the profile creator selects from amongst such available gamut mapping techniques.

For colors for which no gamut mapping is required, the transformation provided by the extended CMYK profile is reversible to within some matching criterion.

In one embodiment, the profile is stored in the processing system such as processing system 101 (FIG. 1) in mass storage system 142. One such profile is shown as profile 110. A CMYK image 122 is also shown stored in the mass storage system, as the an extended CMYK to colorant transformation to which the profile 110 is associated. Mass storage system 142 may at any one time contain many such transformations and many device profiles, some of which associated with one of the stored transformations.

In one embodiment, information about the transformation 124 and profile 110 is stored with the extended CMYK image 122. In one embodiment, the information is in the form of one or more pointers to the device profile and associated transformation.

It should be noted that the invention is applicable to any output device that uses more than the four CMYK colorants. The colorant(s) in addition to CMYK may be to extend the gamut such that the gamut of the extended CMYK color space transformed to the colorant color space of the output device is larger than the gamut of a regular CMYK color space for output on a regular CMYK output device. The colorants in addition to CMYK may in addition, or alternately be to increase dynamic range within the gamut, e.g., using a light magenta colorant. The printer may use in addition one or more of an orange (O) colorant, a green (G) colorant, a red (R) colorant, a blue (B) colorant, a light cyan (Lc) colorant, and a light magenta (Lm) colorant. Other inks also might be used. Thus, the printer may use CMYKOG, CMYKOB, CMYKOGB, CMYKGB, CMYKR, CMYKG, CMYKRG, CMYKRGB, or CMYKLcLm. Furthermore, the order of the outputting the inks also may be different.

It will be understood that the steps of methods and flowcharts discussed are performed in one embodiment by an appropriate one or more processor of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

The instructions (e.g., computer readable code segments in storage) may be read from storage into memory. Execution of sequences of instructions contained in memory causes one or more processor to perform the process steps described herein. In alternative embodiments, hard-wired circuitry may be used in place of or in combination with software instructions to implement the invention. Thus, embodiments of the invention are not limited to any specific combination of hardware circuitry and software.

The terms "carrier medium" and "computer-readable medium" as used herein refer to any medium that participates in providing instructions to a processor for execution. Such a medium may take many forms, including but not limited to, non-volatile media, volatile media, and transmission media. Non-volatile media includes, for example, optical or magnetic disks, such as a storage device which is part of mass storage. Volatile media includes dynamic memory such as RAM. Transmission media include coaxial cables, copper wire and fiber optics, including the wires that comprise a bus within a computer. Transmission media can also take the form of acoustic or light waves, such as those generated during radio wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method for representing a digital image in an extended CMYK color space that has an extended color gamut, the image for output to an output device that uses a set of more than four colorants and is capable of reproducing the extended color gamut, the method comprising:

providing a transformation from the extended CMYK color space to amounts of each of the set of colorants of the output device, wherein the extended CMYK color space is a CMYK color space that has an extended color gamut that is wider and/or has more dynamic range than CMYK using real CMYK inks, wherein the C, M, Y, and K values of the extended CMYK color space do not necessarily represent amounts of real inks of a real output device;

providing a device profile for a virtual output device that uses the extended CMYK color space, the device profile associated with the transformation such that a set of color coordinate values in a first color space having the color coordinate values is converted by the device profile to the extended CMYK color space such that the virtual output device behaves as if it was a CMYK device with extended CMYK values, and such that a color in the first color space can be converted by the device profile to extended CMYK values that can be transformed by the associated provided transformation to the colorant values of the output device that would produces a substantial color match; and representing the digital image in the extended CMYK color space, such that the digital image can be manipulated as if it was a CMYK image using real CMYK values, such that the color of a print produced by printing the colorant values obtained by transforming a first set of extended CMYK values obtained by the device profile converting a set of color coordinate values in the first color space substantially matches the color represented by the set of color coordinate values in the first color space.

2. A method as recited in claim 1, wherein the device profile provides for converting a color represented by a set of color coordinate values in the first color space into a set of extended CMYK values such that a color in a print produced by printing the colorant values obtained by transforming the set of extended CMYK values that would result from applying the conversion of the device profile to the set of color coordinate values in the first color space matches the color represented by the set of color coordinate values in the first color space in the case the color of the print is within the extended gamut of the output device.

3. A method as recited in claim 1, wherein the set of colorants of the output device includes CMYK and at least one additional colorant such that the gamut of the output device is extended beyond a device that uses only the CMYK.

4. A method as recited in claim 3, wherein the set of colorants of the output device includes CMYKOG.

5. A method as recited in claim 3, wherein the set of colorants of the output device includes CMYKRGB.

6. A method as recited in claim 3, wherein the transformation is continuous.

7. A method as recited in claim 3, wherein the transformation maps the whole of the CMYK space onto a subspace of the space defined by the colorants of the output device.

8. A method as recited in claim 3, wherein the transformation separately transforms the extended K (black) to the black in the set of colorants and the extended CMY to the non-black colorants of the output device.

9. A method as recited in claim 3, further comprising:
providing the digital image in a regular CMYK color space as set of regular CMYK-separations; and
converting the CMYK values in the image to extended CMYK values in the extended CMYK color space,
wherein the transformation is such that the combination of converting the CMYK values in the image to extended CMYK values and transforming the image to the set of colorants maintain the regular CMYK-separations intact and add one or more additional colorants.

10. A method as recited in claim 3, wherein the transformation is reversible.

11. A method as recited in claim 1, further comprising:
storing information about the device profile associated with the transformation.

12. A method as recited in claim 1, further comprising:
storing the image represented in the extended CMYK color space; and
storing information about the transformation such that the stored information and the digital image in the extended CMYK color space are sufficient to reproduce the digital image on the output device.

13. A method as recited in claim 12, further comprising:
storing information about the device profile associated with the transformation.

14. A method as recited in claim 1, wherein the first color space is a device independent color space.

15. A method as recited in claim 14, wherein the device profile includes information about the extended gamut covered by the extended CMYK color space and wherein conversion from the device independent color space to the extended CMYK color space includes gamut mapping for colors that are outside the extended gamut.

16. A method as recited in claim 15, wherein the color profile further provides a conversion from a set of CMYK values in the extended CMYK space to a set of coordinates in the device independent color space, and wherein the conversion to the device independent color space reverses the conversion of a color from the device independent color space within the extended gamut.

17. A method as recited in claim 14, wherein the color profile provides a conversion from a set of CMYK values in the extended CMYK space to a set of coordinates in the device independent color space and a conversion from a set of coordinates in the device independent color space to a set of CMYK values in the extended CMYK space.

18. A method as recited in claim 17, further comprising:
providing a display profile for converting colors in the device independent color space into the color space of a display; and
viewing the digital image represented in the extended CMYK space on the display.

19. A method as recited in claim 17, further comprising:
providing a proofing profile for converting colors in the device independent color space into the color space of a hard copy proofing device; and
outputting the digital image represented in the extended CMYK space on the hard copy proofing device.

20. A method of creating a digital image in CMYK for output on an output device that uses more than four colorants and is capable of reproducing an extended color gamut, the method comprising:
providing a transformation from an extended CMYK color space to amounts of each of the set of colorants of the output device, wherein the extended CMYK color space is a CMYK color space that has an extended color gamut that is wider and/or has more dynamic range than CMYK using real CMYK inks, wherein the C, M, Y, and K values of the extended CMYK color space do not necessarily represent amounts of actual inks of an actual output device;
creating the digital image in the extended CMYK color space; and
transforming the image in the extended CMYK color space to a set of separations for each of the set of colorants of the output device using the provided transformation.

21. A method as recited in claim 20, further comprising:
providing a device profile for a virtual device that uses the extended CMYK color space, the profile associated with the transformation and providing for converting between a first color space defined by a set of color coordinate values and the extended CMYK color space defined by extended CMYK values, that the virtual device behaves as if it was a CMYK device with the extended CMYK values, and such that a color in the first color space can be converted by the device profile to extended CMYK values that can be transformed by the associated provided transformation to the colorant values of the output device that would produces a substantial color match.

22. A method as recited in claim 21, wherein the creating of the digital image in the extended CMYK color space includes:
providing the digital image in a regular CMYK color space as a set of ordinary CMYK separations; and
converting the CMYK values in the image to extended CMYK values in the extended CMYK color space.

23. The method of claim 22 where the set of colorants of the output device includes CMYK and at least one more colorant.

24. A method as recited in claim 23, wherein the transformation is such that the combination of converting the CMYK values in the image to extended CMYK values and transforming the image to the set of colorants maintain the regular CMYK-separations intact and add one or more additional colorants.

25. A method as recited in claim 21, wherein the set of colorants of the output device includes CMYK and at least one more colorant.

26. A method as recited in claim 25, wherein the set of colorants of the output device includes CMYKOG.

27. A method as recited in claim 25, wherein the set of colorants of the output device includes CMYKRGB.

28. A method as recited in claim 25, wherein the transformation is continuous.

29. A method as recited in claim 25, wherein the transformation maps the whole of the CMYK space onto a subspace of the space defined by the colorants of the output device.

30. A method as recited in claim 25, wherein the transformation separately transforms the extended K (black) to the black in the set of colorants.

31. A method as recited in claim 25, wherein the transformation is reversible.

32. A method as recited in claim 21, further comprising:
storing the image in the extended CMYK color space.

33. A method as recited in claim 32, further comprising:
storing information about the device profile associated with the transformation.

34. A method as recited in claim 32, further comprising:
storing information about the transformation such that the stored information and the digital image in the extended CMYK color space are sufficient to reproduce the digital image on the output device.

35. A method as recited in claim 34, further comprising:
storing information about the device profile associated with the transformation.

36. A method as recited in claim 21, wherein the first color space is a device independent color space.

37. A method as recited in claim 36, wherein the device profile includes information about the extended gamut covered by the extended CMYK color space and wherein conversion from the device independent color space to the extended CMYK color space includes gamut mapping for colors that are outside the extended gamut.

38. A method as recited in claim 37,
wherein the color profile provides a first conversion from a set of CMYK values in the extended CMYK space to a set of coordinates in the device independent color space and a second conversion from a set of coordinates in the device independent color space to a set of CMYK values in the extended CMYK space, and
wherein the first conversion reverses the second conversion of a color within the extended gamut.

39. A method as recited in claim 38, further comprising:
providing a display profile for converting colors in the device independent color space into the color space of a display; and
viewing the digital image represented in the extended CMYK space on the display.

40. A method as recited in claim 38, further comprising:
providing a proofer profile for converting colors in the device independent color space into the color space of a hard copy proofing device; and
producing a hard copy of the digital image represented in the extended CMYK space using the hard copy proofing device.

41. A method as recited in claim 20, wherein the gamut of the extended CMYK color space transformed to the colorant color space of the output device is larger than the gamut of a regular CMYK color space of amounts of actual CMYK inks for output on a CMYK output device that uses such actual CMYK inks.

42. A non-volatile or volatile computer readable medium encoded with computer readable code segments to instruct one or more processors of a processing system to store a digital image in an extended CMYK color space that has an extended color gamut, the digital image provided in a first color space and being for output to an output device that uses a set of more than four colorants and is capable of reproducing the extended color gamut, the computer readable medium comprising:
one or more code segments to instruct the processor to transform image data in the extended CMYK color space to amounts of each of the set of colorants of the output device according to a transformation, wherein the extended CMYK color space is a CMYK color space that has an extended color gamut that is wider and/or has more dynamic range than CMYK using real CMYK inks, wherein the C, M, Y, and K values of the extended CMYK color space do not necessarily represent amounts of inks of an output device; and
one or more code segments to instruct the processor to convert the digital image between the first color space and the extended CMYK color space such that an output on the output device made from the amounts of the set of colorants obtained by transforming the extended CMYK values that would result from converting any color in the first color space that is in the extended gamut substantially color matches the color in the first color space; and
one or more code segments to instruct the processor to store the converted digital image.

43. A computer readable medium as recited in claim 42, wherein the converting is according to a device profile for the extended CMYK color space that is associated with the transformation such that the output device behaves as if it was a CMYK device with the extended CMYK values.

44. A computer readable medium as recited in claim 43, wherein the first color space is a regular CMYK color space such that the digital image is provided in a regular CMYK color space as a set of ordinary CMYK separations.

45. The computer readable medium of claim 43 where the set of colorants of the output device includes CMYK and at least one more colorant.

46. A computer readable medium as recited in claim 45, wherein the transformation is such that the combination of converting the CMYK values in the image to extended CMYK values and transforming the image to the set of colorants maintain the regular CMYK-separations intact and add one or more additional colorants.

47. A computer readable medium as recited in claim 43, wherein the set of colorants of the output device includes CMYK and at least one more colorant.

48. A computer readable medium as recited in claim 47, wherein the set of colorants of the output device includes CMYKRGB.

49. A computer readable medium as recited in claim 47, wherein the transformation is continuous.

50. A computer readable medium as recited in claim 47, wherein the transformation maps the whole of the CMYK space onto a subspace of the space defined by the colorants of the output device.

51. A computer readable medium as recited in claim 47, wherein the transformation separately transforms the extended K (black) to the black in the set of colorants.

52. A computer readable medium as recited in claim 47, wherein the transformation is reversible.

53. A computer readable medium as recited in claim 47, wherein the set of colorants of the output device includes CMYKOG.

54. A computer readable carrier medium as recited in claim 43, further comprising:
one or more code segments to instruct the processor to store information about the transformation such that the stored information and the digital image in the extended CMYK color space are sufficient to reproduce the digital image on the output device.

55. A computer readable medium as recited in claim 43, further comprising:
one or more code segments to instruct the processor to store information about the device profile associated with the transformation.

56. A computer readable medium as recited in claim 55, further comprising:
one or more code segments to instruct the processor to store information about the transformation such that the stored information and the digital image in the extended CMYK color space are sufficient to reproduce the digital image on the output device.

57. A computer readable medium as recited in claim 43, wherein the first color space is a device independent color space.

58. A computer readable medium as recited in claim 57, wherein the device profile includes information about the extended gamut covered by the extended CMYK color space and wherein conversion from the device independent color space to the extended CMYK color space includes gamut mapping for colors that are outside the extended gamut.

59. A computer readable medium as recited in claim 58,
wherein the color profile provides a first conversion from a set of CMYK values in the extended CMYK space to a set of coordinates in the device independent color space and a second conversion from a set of coordinates in the device independent color space to a set of CMYK values in the extended CMYK space, and
wherein the first conversion reverses the second conversion of a color within the extended gamut.

60. A computer readable medium as recited in claim 57, wherein the color profile provides a first conversion from a set of CMYK values in the extended CMYK space to a set of coordinates in the device independent color space and a second conversion from a set of coordinates in the device independent color space to a set of CMYK values in the extended CMYK space.

61. A computer readable medium as recited in claim 60, further comprising:
one or more code segments to instruct the processor to retrieve a display profile for converting colors in the device independent color space on a display into the color space of a display; and
one or more code segments to instruct the processor to view the digital image represented in the extended CMYK space on the display.

62. A computer readable medium as recited in claim 60, further comprising:
one or more code segments to instruct the processor to retrieve a proofer profile for converting colors in the device independent color space into the color space of a hard copy proofing device; and
one or more code segments to instruct the processor to convert the digital image represented in the extended CMYK space to the color space of the hard copy proofing device using the proofer profile.

* * * * *

UNITED STATES PATENT AND TRADEMARK OFFICE
CERTIFICATE OF CORRECTION

| | |
|---|---|
| PATENT NO. | : 7,164,498 B2 |
| APPLICATION NO. | : 10/177636 |
| DATED | : January 16, 2007 |
| INVENTOR(S) | : Van Bael |

Page 1 of 1

It is certified that error appears in the above-identified patent and that said Letters Patent is hereby corrected as shown below:

Column 1, line 54, kindly change "Modem color" to --Modern color--.

Column 3, line 9, kindly change "modem color" to --modern color--.

Column 3, line 56, kindly change "modem color" to --modern color--.

Column 17, line 3 (the 1st line of claim 45), kindly change "of claim 43" to --of claim 44--.

Column 17, line 32 (the 1st line of claim 54), kindly delete the word "carrier".

Signed and Sealed this

Sixth Day of March, 2007

JON W. DUDAS
*Director of the United States Patent and Trademark Office*